United States Patent [19]

Carlson

[11] 4,100,915

[45] Jul. 18, 1978

[54] SOLAR ENERGY HEATING APPARATUS

[76] Inventor: Ingemar Carlson, Nybrovag 6, 78100 Borlange, Sweden

[21] Appl. No.: 770,096

[22] Filed: Feb. 18, 1977

[51] Int. Cl.$^2$ .............................................. F24J 3/02
[52] U.S. Cl. ................................................ 126/271
[58] Field of Search ............................... 126/270, 271

[56] References Cited

U.S. PATENT DOCUMENTS

| | | | |
|---|---|---|---|
| 1,946,184 | 2/1934 | Abbot | 126/271 |
| 3,915,147 | 10/1975 | Rimeer | 126/271 |
| 3,917,942 | 11/1975 | McCay | 126/270 |
| 3,964,464 | 6/1976 | Hockman | 126/271 |
| 3,974,824 | 8/1976 | Smith | 126/271 |
| 4,013,885 | 3/1977 | Blitz | 126/270 |
| 4,018,215 | 4/1977 | Pei | 126/270 |
| 4,026,273 | 5/1977 | Parker | 126/271 |
| 4,027,653 | 6/1977 | Meckler | 126/270 |
| 4,036,208 | 7/1977 | Bauer | 126/271 |
| 4,064,868 | 12/1977 | Nussbaum | 126/271 |

*Primary Examiner*—Carroll B. Dority, Jr.
*Attorney, Agent, or Firm*—John J. Kowalik

[57] ABSTRACT

A solar heater having a reflector which focuses sun rays onto a solar heat-absorbing collector.

The collector consists of a transparent vacuum flask with a novel highly efficient collector cell including heat-transfer transparent fluid therein. The collector comprises a center support in the form of a metal inlet pipe and a series of frusto-conical heat-absorbing cones and intervening sleeves clamped to the pipe. The cones are formed of thin aluminum and have highly polished reflective interior sides. The exterior sides of the cups as well as the sleeves are blackened. The reflector is arranged to focus the rays perpendicularly to the flask so that the heat-absorbing exterior sides of the cones which have an angle of incidence reflect the rays axially of the tube into the interior sides of the adjacent cones, which being arranged at preferably 45° to the axis of the tube, reflect the rays against the intermediate black sleeve. The heat absorbed by the metal is transferred to fluid which is circulated through the flask to a use apparatus such as a boiler, turbine, etc.

17 Claims, 8 Drawing Figures

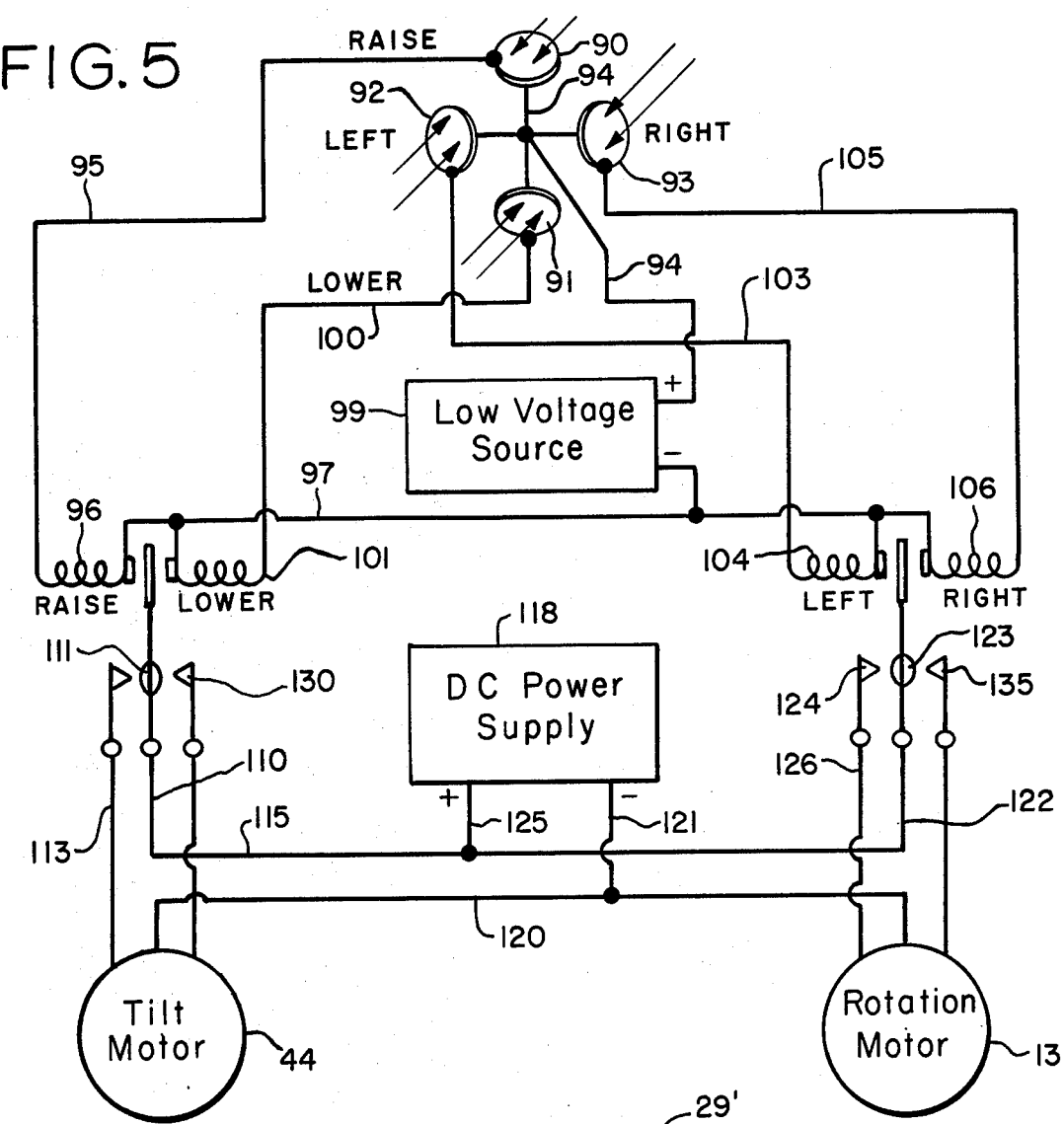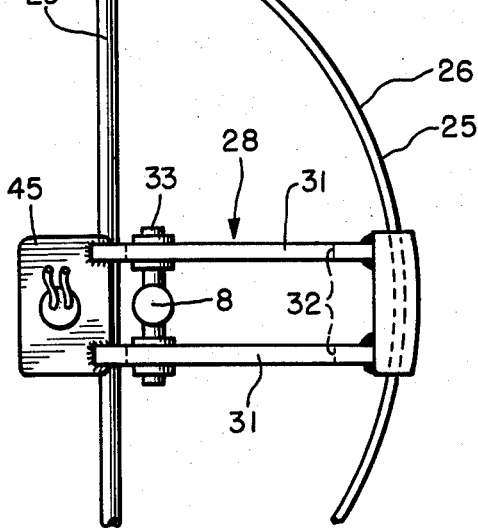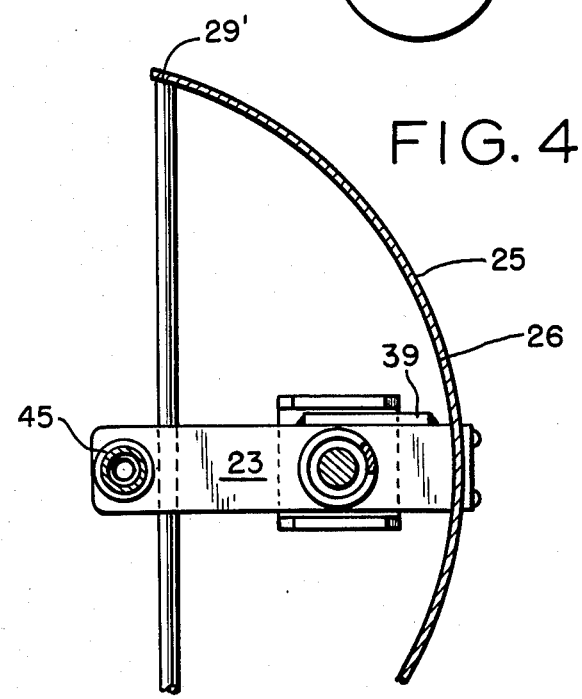

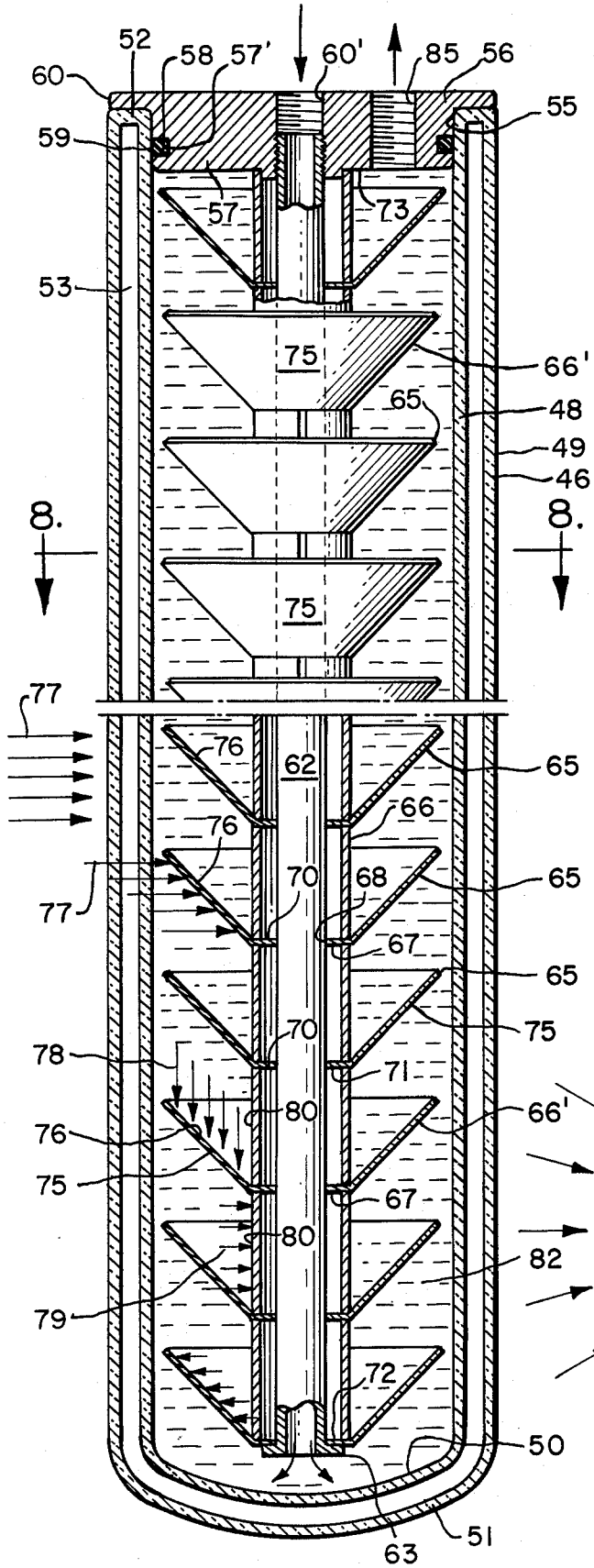
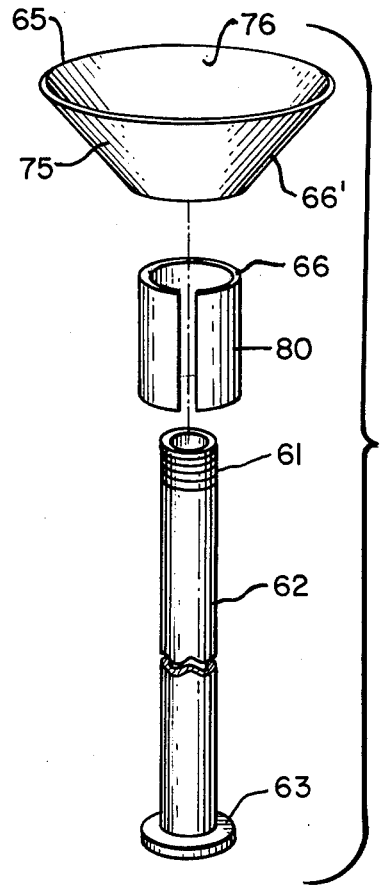
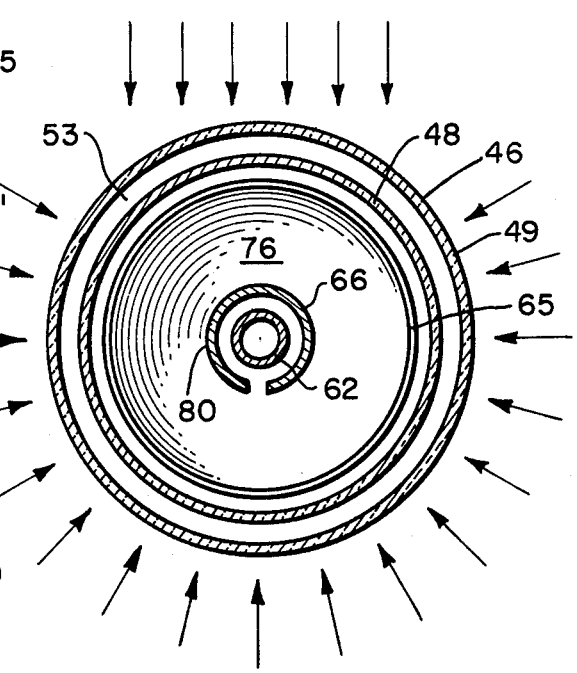
FIG. 6
FIG. 7
FIG. 8

SOLAR ENERGY HEATING APPARATUS

DISCUSSION OF THE PRIOR ART

Various reflector-focused solar heating systems have heretofore been proposed such as shown in U.S. Pat. No. 3,923,039; 3,957,030; 3,985,119; 3,974,824; 3-939,819; and 3,943,911. All of these systems operate on a radiator effect in which the heat collecting surfaces are blackened and are positioned for direct impingement by the sun's rays. A large percentage of the rays are diffused whereby the efficiency of the unit is decreased.

SUMMARY OF THE INVENTION

This invention is directed to a novel heat collector in which parts of the collector are arranged to reflect the rays from one surface to another so as to maximize the exposure and thus materially improve the efficiency of the unit.

A principal object of the invention is to provide a novel heat cell in which the heat collecting medium is contained in a transparent vessel and is isolated from the ambient temperature by a vacuum chamber which permits the rays to penetrate into the vessel for impingement against heat-absorbing surfaces of a novel, highly efficient heat collector.

The invention comprehends the provision of a heat collector which comprises a tree-like assembly in which the trunk is defined by a metal fluid passage pipe on which there are sleeved a plurality of truncated cones which are appropriately separated by sleeves, the exterior sides of the cones being blackened and the interiors being highly polished reflectors and so arranged that the rays which strike the exteriors of the cones are deflected into the interiors of the adjacent cones and the polished surfaces thereon reflect these rays onto the blackened intervening sleeves and thus maximizing absorption of heat.

A further object is to provide a novel self-tracking apparatus which is adapted to be mounted, for example, upon the roof of a building, and which positions the reflector horizontally in optimum relation to the sun during the daylight hours and which also adjusts for the azimuth angle.

The invention comprehends connecting one or more of the solar units to a bailer or other heating unit, hot water system, etc.

These and other objects and advantages inherent in and encompassed by the invention will become more apparent from the specification and drawings, wherein:

FIG. 3 is a further enlarged cross-sectional view taken on line 3—3 of FIG. 2;

FIG. 4 is a cross-sectional view on line 4—4 of FIG. 2;

FIG. 5 is a schematic view of the electric circuit for positioning the unit;

FIG. 6 is an enlarged axial-sectional view of my novel heat cell;

FIG. 7 is an exploded broken-apart view of a section of the cell; and

FIG. 8 is a transverse cross-section taken essentially on line 8—8 of FIG. 6.

DESCRIPTION OF THE INVENTION

Figure 1:
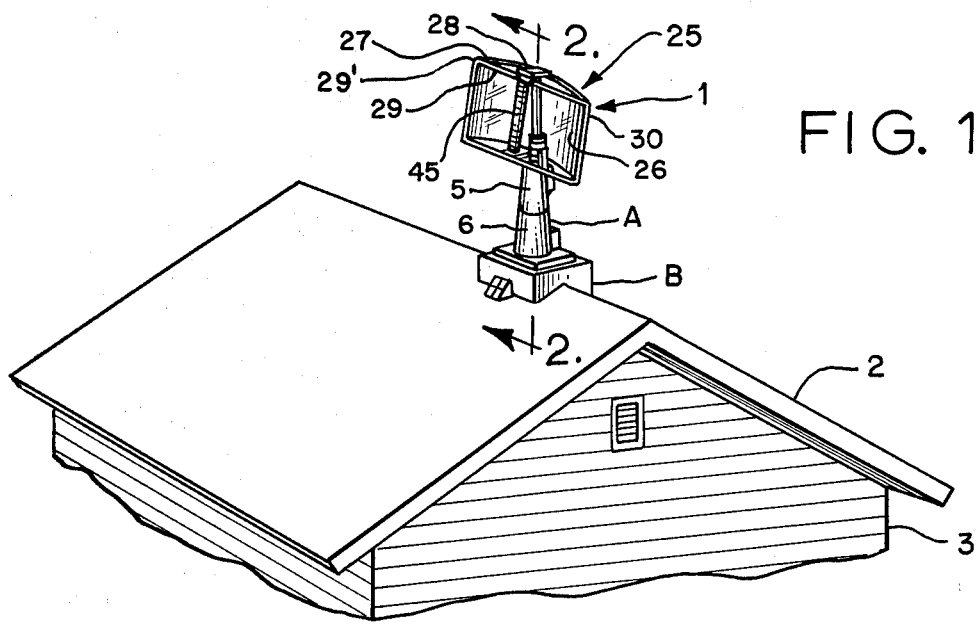
FIG. 1 is a perspective view of the invention shown mounted on a building roof.

The solar energy apparatus 1, is shown in the drawings as being mounted on a roof 2 of a building 3, although it will be apparent that the type of support is immaterial.

As shown, the unit has a pedestal A the base B of which is connected to the roof. The pedestal is split into upper and lower sections 5 and 6 with an intervening bearing 7 permitting relative rotation therebetween about a vertical axis. The pedestal is hollow and provides a housing for a vertical shaft 8 which extends intermediate its ends through bearing 7. The lower end of shaft 8 is connected to a spur gear 9 which is driven by a worm gear 10 mounted on the shaft 11 of an electric motor 12 positioned within the cavity 13 of the lower section 5. The shaft is journaled at its lower end in a bearing 14 which is fitted within an aperture in a bottom wall 15 in section 5.

The shaft 8 extends through apertures 17,18 in the socket 19 and ball 20 provided respectively in the upper end wall 21 of the upper section and on the bottom wall 23 of a parabolic mirror section 25 which comprises a curved reflective wall portion 26, the upper end of which is provided with a frame 27 including a center brace 28 and a cross-brace 29, connected intermediate its ends to the front end of brace 28 and at its opposite ends 29′,30 to the respective ends of the mirror wall 23. Brace 28 is bifurcated and has legs 31,31′ with arcuate slots 32 therein of common radius from the effective center of the ball and socket assembly 19,20 and receive a transverse pin 33 mounted through the upper end of shaft 8.

The ball 20 is maintained within the socket 19 by a compression spring 34 which is sleeved over shaft 8 and is compressed between the top side 35 of the bottom wall 23 of the reflector and a vertically adjustable abutment 37 fixed to the shaft 8 by set screw 38.

The bottom wall 23 is provided with a gear sector 39 which has teeth 40 meshing with a worm gear 41 attached to a drive shaft 43 of an electrical tilt motor 44 which is housed in the lower pedestal section. It will be observed that the tilting of the reflector occurs about a horizontal axis and is accommodated by the conical shape of the aperture 18 in the ball 20.

A collector or heat cell 45 is positioned in front of the reflector in its area of focus. The collector comprises an outer vacuum flask or tube 46 which includes inner and outer transparent cylinders 48,49 made of quartz, glass or suitable plastic material. The lower ends of the cylinders are formed with integral end walls 50 and 51 and the upper ends are integrally joined to each other by end wall 52. A vacuum chamber 53 is formed between the inner and outer tubes.

The opening 55 in the inner tube is closed by an end cap 56 preferably made of plastic of low thermal conductivity such as "Lexan," which preferably has a plug portion 57 extending into the opening 55 and has a peripheral groove 57 therein with a sealing O-ring 58 therein compressed against the interior surface 59 of the inner tube. The cap 56 has an annular flange 60 which overlaps the outer wall 52.

The cap 56 is provided centrally thereof with an inlet passage 60′ into which is threaded the upper end 61 of a support in the form of a metal inlet pipe 62 which extends to adjacent the lower end of the flask. The lower end of the pipe 62 is provided with an outturned flange 63.

A series of heat absorbent elements 65 with intervening spacers 66 are sleeved onto the inlet pipe. Each element 65 is a thin dished disk or cone which has a frusto-conical side wall 66' which converges toward an inturned mounting flange 67 which has a center aperture 68 closely fitting the center pipe 62 and in thermal tight contact therewith and on its inner sides 70, with the bottom end of the spacer 66 within the associated cone and at its bottom side 71 with the upper end of the spacer therebelow. The bottom side 71 of the flange 67 of the cone bears at 72 against the top side of the pipe flange 63 and the uppermost sleeve 66 engages the bottom side 73 of the end cap 56.

For maximum efficiency the greatest number of cones is positioned in the flask and it is for this reason that the sleeves each have a length only slightly greater than the depth of each cone.

As best seen in FIG. 6, the cones which are preferably formed of aluminum are focused toward the closed end of the tube. The side wall of each cone is disposed at approximately 45° to the axis of the cell and has a blackened exterior side 75 and a highly polished interior side 76. The cell is oriented at 90° to the incoming rays so that the angle of incidence of the sun rays is 45° to the outer surfaces of the cones as shown at 77, FIG. 6. Some of these rays are reflected axially as shown at 78 toward the interior reflective surfaces 76 of the cone therebelow, and these rays as shown at 79 are in turn reflected by the interior surfaces, which also are arranged at 45° to the axis of the cell, against the black surfaces 80 of the adjacent sleeve. Any rays which have not diffused will bounce off the surfaces 80 against the interior surfaces 76 and then be directed again against surfaces 75. Thus the effect of the sun rays is prolonged and maximum amount of heat is extracted by not only heating the collector cones or fins but also the sleeves as well as the fluid medium 82 which fills the inner tube of the heat cell. The fluid medium may be water in areas where freezing does not occur, but is preferably alcohol or carbon tetrachloride or any other suitable clear, transparent fluid medium well known in the art.

Figure 2:
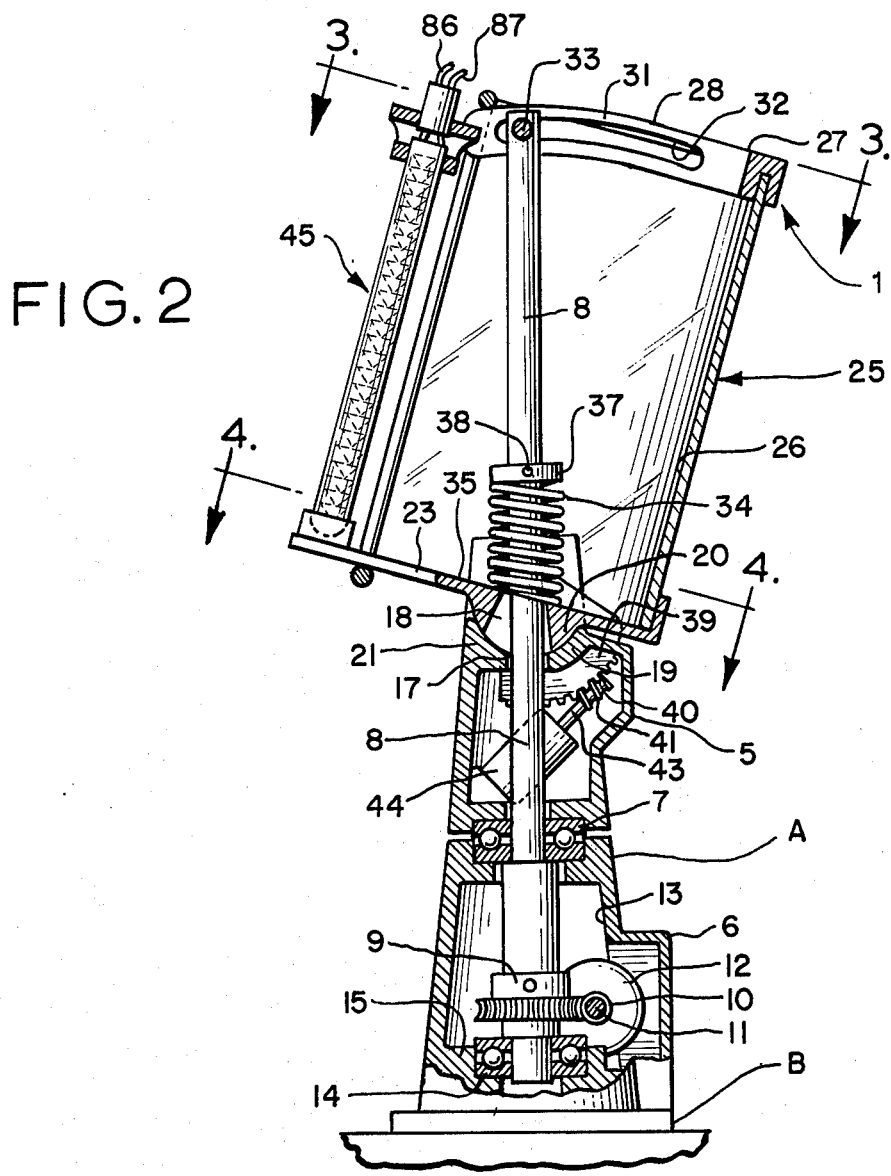
FIG. 2 is an enlarged axial-sectional view of the solar unit taken substantially on line 2—2 of FIG. 1.

As best seen in FIG. 6, the end cap is provided with an outlet passage 85 which is connected to a suitable conduit 86 for connection to a hot water tank, boiler or other apparatus which has a return line 87 (FIG. 2) connected to the inlet end of the thermal or heat cell.

FIG. 5 is a schematic drawing showing a plurality of light-sensitive photocells 90,91,92,93 which are interconnected at one side to a common line or wire 94 to one pole (positive) of a low voltage source.

Cell 90 is connected through line or wire 95 to one end of a switch solenoid 96 which is connected through line 97 to the other pole (negative) of the low voltage source, such as a battery 99.

Cell 91 is connected through line 94 to one (positive) side of the voltage source 99 and at its other side through line 100 solenoid coil 101 to line 97 to the other (negative) side of the emf low voltage source 99.

Cell 92 is connected through line 94 to the (negative) pole and to line 103 and solenoid coil 104 to line 97 and cell 93 is connected through line 105 to solenoid coil 106 and line 97 to one side (negative) of the emf source 99 and through line 94 to the other (positive) pole of the emf source 99.

The respective light-sensitive cells are positioned in such manner that the light will strike either the upper and either left or right or the lower and left or right cell as shown in FIG. 5. For example, if the sun is high over the horizon it will strike cell 90 whereupon current will flow from the positive pole of the low voltage source through cable 94 through cell 90, wire 95, energizing coil 96, by passing therethrough and through wire 97 to the negative pole. The electromagnetic field developed in coil 96 draws the arm 110 leftwardly closing contact 111 thereon against contact 112, which is connected by wire or line 113 to the appropriate winding of the tilt motor 44, causing it to rotate in the appropriate direction to pivot the gear sector 39 in a clockwise direction, FIG. 2, which shows the apparatus in its uppermost tilted position. The current flows from the supply line 115 of the D.C. power supply 118, through the contact arm 110, contacts 111,112 to the motor 44 through wire 113 to the return line 120 to the negative pole 121.

If the cell 92 is exposed to the sun rays the reflector will swing leftwardly horizontally until the rays no longer shine on cell 92. When cell 92 is operating the current flows from the positive pole of the emf source 99 through wire 94, cell 92, wire 103, coil 104 and line 97 to the negative pole of emf source 99. Solenoid 104 is energized drawing the switch arm 122 leftwardly closing contacts 123,124. Current flows from positive pole 125 of emf supply source 118 through wire 115, arm 122, contacts 123,124, wire 126, through the appropriate winding of reversible motor 13 and wire 120 to pole 121 of emf source 118, thus rotating the reflector assembly leftwardly.

As the sun lowers on the horizon the cell 91 will be activated by the sun's rays striking it, whereupon current flows through line 94, cell 91, wire 100, solenoid coil 101 to the negative pole of electrical power source 99. This causes arm 110 to tilt rightwardly closing contact 130, through wire 131 to the appropriate windings of tilt motor 44 to swing the gear sector 39 counterclockwise, FIG. 2, tilting the reflector-collector assembly downwardly until the cell 91 is no longer exposed to the rays.

If cell 93 is exposed to the sun rays, the current flows from source 99, wire 94 through cell 93 through wire 105, coil 106, line 97 to the negative pole of the emf source 99. Coil 106 being energized swings arm rightwardly (FIG. 5) closing contacts 123,135 and the current flows from pole 125, through line 115, arm 122, contacts 123,135 line 136 to reversible motor 13, which rotates the shaft 8 to turn the reflector rightwardly horizontally until the solenoid 93 no longer is exposed to the sun's rays.

It will now become readily apparent to those skilled in the art that a preferred embodiment illustrating the basic principles of the invention has been disclosed and variations thereof falling within the scope thereof are covered to the extent set forth in the appended claims.

What is claimed is:

1. In a solar heat collector, a support, means carried thereon for absorbing solar heat,
    said means comprising first dark heat absorbent surfaces disposed for direct impingement by solar rays,
    said means comprising other highly polished reflective surfaces,
    said first heat absorbent surfaces having an angle of incidence with the sun rays for deflecting at least a portion of said rays toward said reflective surfaces,
    and said means having other second dark heat absorbent surfaces disposed both to direct impingement by the sun's rays and also to the reflected rays, and means for conducting heat from both heat absorbent surfaces to a use area.

2. A solar energy module comprising an envelope having a fluid outlet passage, a solar energy collector sealed therein having a fluid inlet passage;

a fluid circulated via the inlet into the envelope and out of the outlet, said fluid and envelope being transparent for permitting sun rays to pass therethrough; said collector comprising a column of elements positionable for direct exposure to solar rays, having means for absorbing heat therefrom and reflecting some of said rays, and reflecting means on said elements for bouncing said rays back and forth between said heat absorbing means and said reflecting means to maximize the exposure of said heat absorbing means to said rays, said elements being disposed in heat conducting relation to said fluid.

3. The invention according to claim 2 and said elements being conical shaped and each element focused toward the next succeeding element in the column.

4. The invention according to claim 3 and each element having an external sun-facing side with solar energy absorbing means thereon and angled to provide an angle of incidence to the sun rays such as will reflect sun rays axially of the column toward the adjacent element for impingement by such rays thereagainst.

5. The invention according to claim 2 wherein said envelope has inner and outer portions and a vacuum chamber therebetween providing a thermal barrier between the collector and the ambient external atmosphere.

6. The invention according to claim 4 and each element having an internal polished reflective surface angled to reflect the rays deflected from the adjacent element in a direction transaxially of the column, and solar energy absorbing means on the column between the elements in the path of the reflected rays.

7. The invention according to claim 6 and said solar energy absorbing means arranged to reflect back the rays directly and indirectly impinging thereagainst toward the adjacent reflective surface for reflection thereby toward the absorbing means of the adjacent element, whereby the rays are bounced against a plurality of surfaces on said collector.

8. The invention according to claim 2 and said collector comprising a metal support and said elements being sleeved on the support in thermal conduction therewith, and said inlet passage being in said support.

9. The invention according to claim 2 and a reflector for focusing the sun rays on the collector.

10. The invention according to claim 9 and means for moving said reflector in accordance with the position of the sun for continuously focusing the sun rays on the collector.

11. A solar cell comprising a transparent vacuum flask having inlet and outlet passages, heat collector means mounted within the flask, and a transparent fluid medium circulated through the flask in washing contact with said collector for transferring heat therefrom, and said collector comprising a plurality of cup-shaped disks supported within said tube in axially spaced relation, each disk having a solar heat absorbing surface on one side and a reflective surface on the other side, other absorbing surfaces between the cup-shaped disks, said reflective surfaces being oriented to reflect solar rays onto said other heat absorbing surfaces of said heat collector.

12. The invention according to claim 11 and a reflector for focusing solar rays onto said cell.

13. The invention according to claim 12 and a common support for the cell and reflector, and means carried by the support for tracking the sun rays with said cell and reflector.

14. A solar energy collector comprising a column of similarly oriented axially spaced cup-shaped collector elements each having a side wall with a sun-facing exterior side and an interior side, said exterior side having energy-absorbing means thereon, other energy-absorbing means associated with said column and located between adjacent cup-shaped collector elements and reflective surface means on said interior side of each element, the reflective surface means on each element oriented to redirect sun rays impinging thereon toward said other energy absorbing means associated with said column.

15. The invention according to claim 14 and said column comprising an enclosing envelope formed of material accommodating unimpeded passage of sun rays therethrough.

16. The invention according to claim 15 and said envelope having inner and outer portions and a vacuum chamber therebetween, and a heat-conduction fluid medium circulating within said envelope in thermal-transfer contact with said elements.

17. The invention according to claim 14 and a solar reflector positioned to direct sun rays agains said collector.

* * * * *